(12) United States Patent
Duresky et al.

(10) Patent No.: US 6,889,267 B2
(45) Date of Patent: May 3, 2005

(54) ASYNCHRONOUS COMMUNICATION PROTOCOL USING EFFICIENT DATA TRANSFER FORMATS

(75) Inventors: Nicholas Duresky, San Jose, CA (US); Sameer Nanavati, Fremont, CA (US); Sunil Chaudhari, Milipitas, CA (US); Corey Gee, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 10/304,629

(22) Filed: Nov. 26, 2002

(65) Prior Publication Data

US 2004/0103224 A1 May 27, 2004

(51) Int. Cl.[7] ............................................... G06F 13/00
(52) U.S. Cl. ............................ 710/31; 710/38; 710/52
(58) Field of Search .............................. 710/1, 20, 22, 710/26–28, 31, 33–35, 36–39, 52, 58, 60, 65, 107; 712/225; 713/500; 711/128; 345/538

(56) References Cited

U.S. PATENT DOCUMENTS

| | | | |
|---|---|---|---|
| 5,914,996 A | * | 6/1999 | Huang ........................ 377/39 |
| 6,047,339 A | | 4/2000 | Su et al. |
| 6,088,046 A | * | 7/2000 | Larson et al. ................ 345/538 |
| 6,115,551 A | | 9/2000 | Chao |
| 6,138,209 A | * | 10/2000 | Krolak et al. ................ 711/128 |
| 6,219,737 B1 | | 4/2001 | Chen et al. |
| 6,327,667 B1 | * | 12/2001 | Hetherington et al. ...... 713/500 |
| 6,466,192 B2 | * | 10/2002 | Imamura ...................... 345/98 |
| 6,516,385 B1 | * | 2/2003 | Satoyama et al. .......... 711/112 |
| 6,529,976 B1 | * | 3/2003 | Fukuzawa et al. ............ 710/65 |

* cited by examiner

Primary Examiner—Fritz Fleming
Assistant Examiner—Alan Chen
(74) Attorney, Agent, or Firm—Blakely, Sokoloff, Taylor & Zafman LLP

(57) ABSTRACT

An embodiment of the present invention includes first and second storage elements. The first storage element stores request information transmitted from a first processor operating at a first frequency. The first and second processors operate at different frequencies. The request information is organized according to a request format. The second storage element stores response information transmitted by a second processor operating at a second frequency different than the first frequency in response to the request information. The response information is organized according to a response format.

34 Claims, 7 Drawing Sheets

ASYNCHRONOUS COMMUNICATION PROTOCOL USING EFFICIENT DATA TRANSFER FORMATS

BACKGROUND

1. Field of the Invention

Embodiments of the invention relates to the field of microprocessors, and more specifically, to communication protocol.

2. Description of Related Art

A bus interface between two processors or devices typically involves data transfers in both directions. For example, in a network processing system, a media processor may interface to a host processor to receive and transmit packets of data. The data transfers may be synchronous or asynchronous. A synchronous data transfer synchronizes the speed of the transmitting and the receiving processors. Synchronous data transfer mode is simple to design but is inflexible to accommodate different clock speeds or processor operating frequencies. An asynchronous data transfer allows processors with different clock frequencies to communicate with each other.

Existing asynchronous interface between two processors operating at different clock frequencies has a number of disadvantages. First, the control path is separated from the data path. This separation prohibits multiple transfers to occur back to back, reducing bus transfer bandwidth. Second, each time a different processor on one side is used, the signal connectivity has to be re-defined, creating difficulties in interfacing circuitry.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention includes first and second storage elements. The first storage element stores request information transmitted from a first processor operating at a first frequency. The first and second processors operate at different frequencies. The request information is organized according to a request format. The second storage element stores response information transmitted by a second processor operating at a second frequency different than the first frequency in response to the request information. The response information is organized according to a response format.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
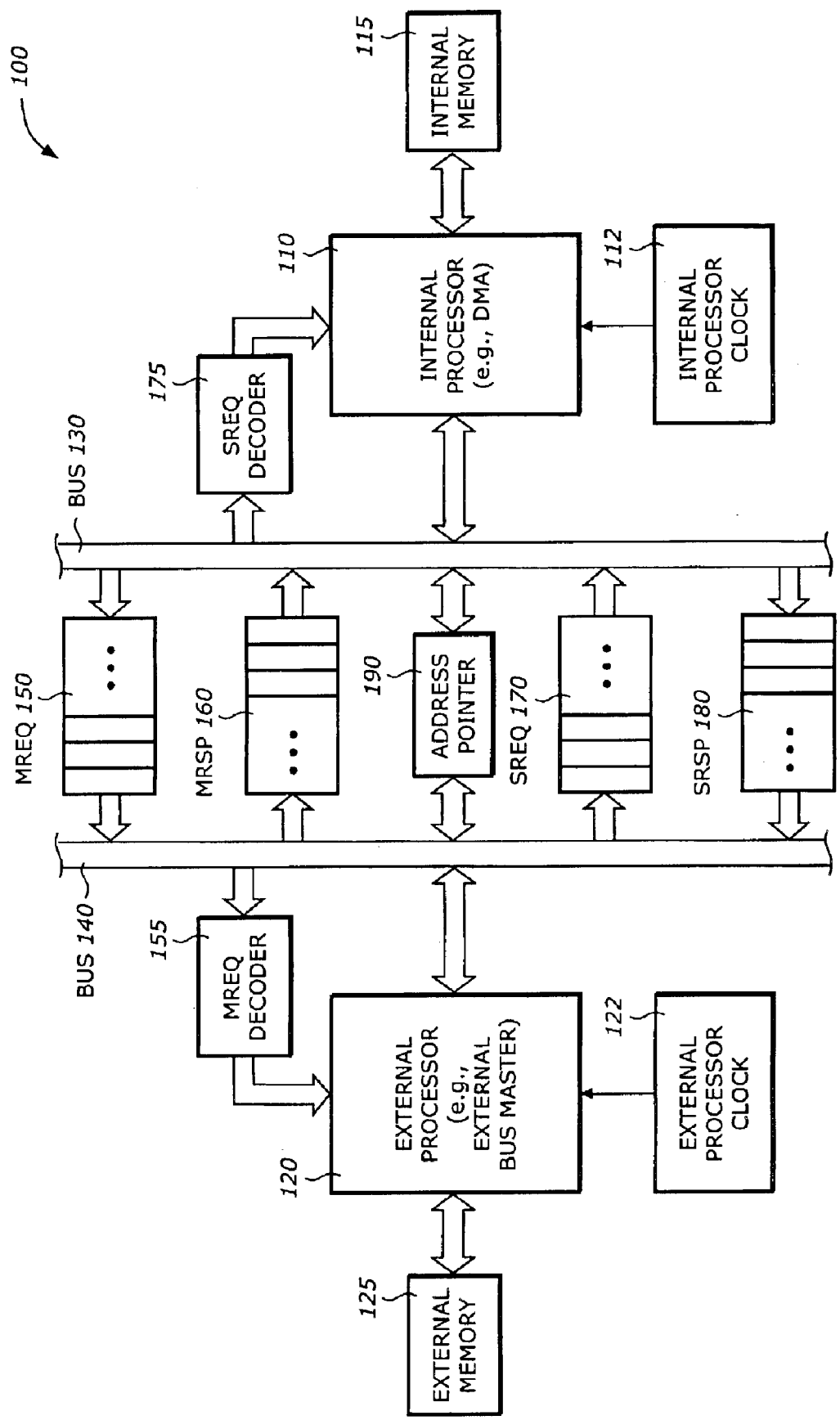
FIG. 1 is a diagram illustrating a system in which one embodiment of the invention can be practiced.

FIG. 1 is a diagram illustrating a system 100 in which one embodiment of the invention can be practiced. The system 100 includes a an internal processor 110, an internal processor clock 112, an internal memory 115, an external processor 120, an external processor clock 122, an external memory 125, buses 130 and 140, a master request (MREQ) storage element 150, a MREQ decoder 155, a master response (MRSP) storage element 160, a slave request (SREQ) storage element 170, a SREQ decoder 175, a slave response (SRSP) storage element 180, and an address pointer 190.

The internal and external processors 110 and 120 may be a central processing unit or processor of any type of architecture, such as embedded processors, mobile processors, network processors, special-purpose processors, media processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The internal and external processors 110 and 120 are bus masters that can have control of the interface bus. The term "internal" and "external" are used with respect to a system bus. In one embodiment, the internal processor 110 is a direct memory access (DMA) engine and the external processor 120 is any external bus master. The internal and external processors 110 and 120 communicate with each other over the buses 130 and 140. The internal and external processors 110 and 120 operate at different or the same frequencies, synchronously or asynchronously, provided by the internal and external processor clocks 112 and 122. In one embodiment, the internal processor 110 operates at a higher frequency than the external processor 120 and the two processors communicate asynchronously. For example, the internal processor 110 may be a DMA engine operating at 112 MHz while the external processor 120 operates at 33 MHz.

Typically, the internal processor 110 is located in a system processing unit such as a network processor. The network processor may be a media processor connected or interfaced to a Voice Over Packet (VOP) gateway. The VOP gateway may be connected to an Internet Protocol (IP) or Asynchronous Transfer Mode (ATM) network for packet-based data traffic, and to a digital Public Switched Telephone Network (PSTN) for legacy voice traffic. The IP/ATM network may include ATM switch or IP router to interface to one of the internal and external processors 110 and 120. The PSTN may be connected to communication equipment such as fax machines, telephones, etc. The internal processor 110 receives and transmits data packets in a network information transmission. The data packets may contain any type of data for transmission such as voice packet. The external processor 120 is another processor to process the data packets transmitted from the internal processor 110 or to send packet data or other information to the internal processor 110. The external processor 120 may be a packet processor, another network processor, an ingress processor, an egress processor, a fabric interface processor, or any other processor that communicates with the internal processor 110. The internal processor 110 is designated as a master and the external processor 120 is designated as a slave. Note that the terms "master" and "slave" are used to distinguish the two processors with respect to their functionalities. A slave may be a bus master which can have control over the system bus.

The internal and external memories 115 and 125 are accessible by the internal and external processors 110 and 120, respectively. The internal and external memories 115 and 125 may be any type of memory that may contain programs, data, operating systems, device drivers, or any other information. The internal and external memories 115 and 125 may also be mass storage device such as a compact disk (CD) ROM, a digital video/versatile disc (DVD), a floppy drive, and a hard drive, and any other magnetic or optic storage devices. The mass storage device provides a mechanism to read machine-accessible media. The machine-accessible media may contain computer readable program code to perform tasks as described in the following.

The bus 130 allows the internal processor 110 to access the storage elements 150, 160, 170, 180, and the address pointer 190. The bus 130 may be a system bus or a local bus, or a combination of the two. The system bus may be any system bus such as the i960Jx External Interface. Similarly, the bus 140 allows the external processor 120 to access the storage elements 150, 160, 170, 180, and the address pointer 190. The bus 140 may be a system bus or a local bus, or a combination of the two.

The storage elements 150, 160, 170, and 180 form a buffer subsystem coupled to the internal and external processors 110 and 120 via the buses 130 and 140. They define a bus interface to allow the two processors 110 and 120 communicate efficiently. They may be any device that can store information such as static random access memory (SRAM) and dynamic RAM. In one embodiment, the storage elements 150, 160, 170, and 180 are asynchronous first-in-first-out (FIFO) devices. The address pointer 190 includes read and write address pointers for the storage elements 150, 160, 170, and 180. The address pointer 190 is accessible by the internal and external processors 110 and 120. When the storage elements 150, 160, 170, and 180 are implemented by FIFO's, the address pointer 190 may be internal to or integrated into them. There are also flags (not shown) associated with the storage elements 150, 160, 170, and 180 to indicate if they are empty or full.

The MREQ and MRSP storage elements 150 and 160 are associated with the functionalities of the internal processor 110. The SREQ and SRSP storage elements 170 and 180 are associated with the functionalities of the external processor 110. The MREQ storage element 150 is coupled to the internal and external processors 110 and 120 to store master request information transmitted from the internal processor 110. The master request information is organized according to a master request format. The MRSP storage element 160 is coupled to the internal and external processors 110 and 120 to store master response information transmitted by the external processor 120 in response to the master request information. The master response information is organized according to a master response format. Similarly, the SREQ storage element 170 is coupled to the internal and external processors 110 and 120 to store slave request information transmitted from the external processor 120. The slave request information is organized according to a slave request format. The SRSP storage element 180 is coupled to the internal and external processors 110 and 120 to store slave response information transmitted by the internal processor 110 in response to the slave request information. The slave response information is organized according to a slave response format.

The MREQ decoder 155 decodes or translates the master request information read from the MREQ storage element 150. The decoded information is used by the external processor 120 to provide proper response. Similarly, the SREQ decoder 175 decodes or translates the slave request information read from the SREQ storage element 170. The decoded SREQ information is used by the internal processor 110 to provide proper response.

The master and slave request and response formats provide an efficient protocol for an asynchronous communication between the internal and external processors 110 and 120. The control and data paths are merged into one path, resulting in higher bus bandwidth. The MREQ, MRSP, SREQ, and SRSP storage elements 150, 160, 170, and 180 provide an asynchronous means of storage or buffer of control and data information.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
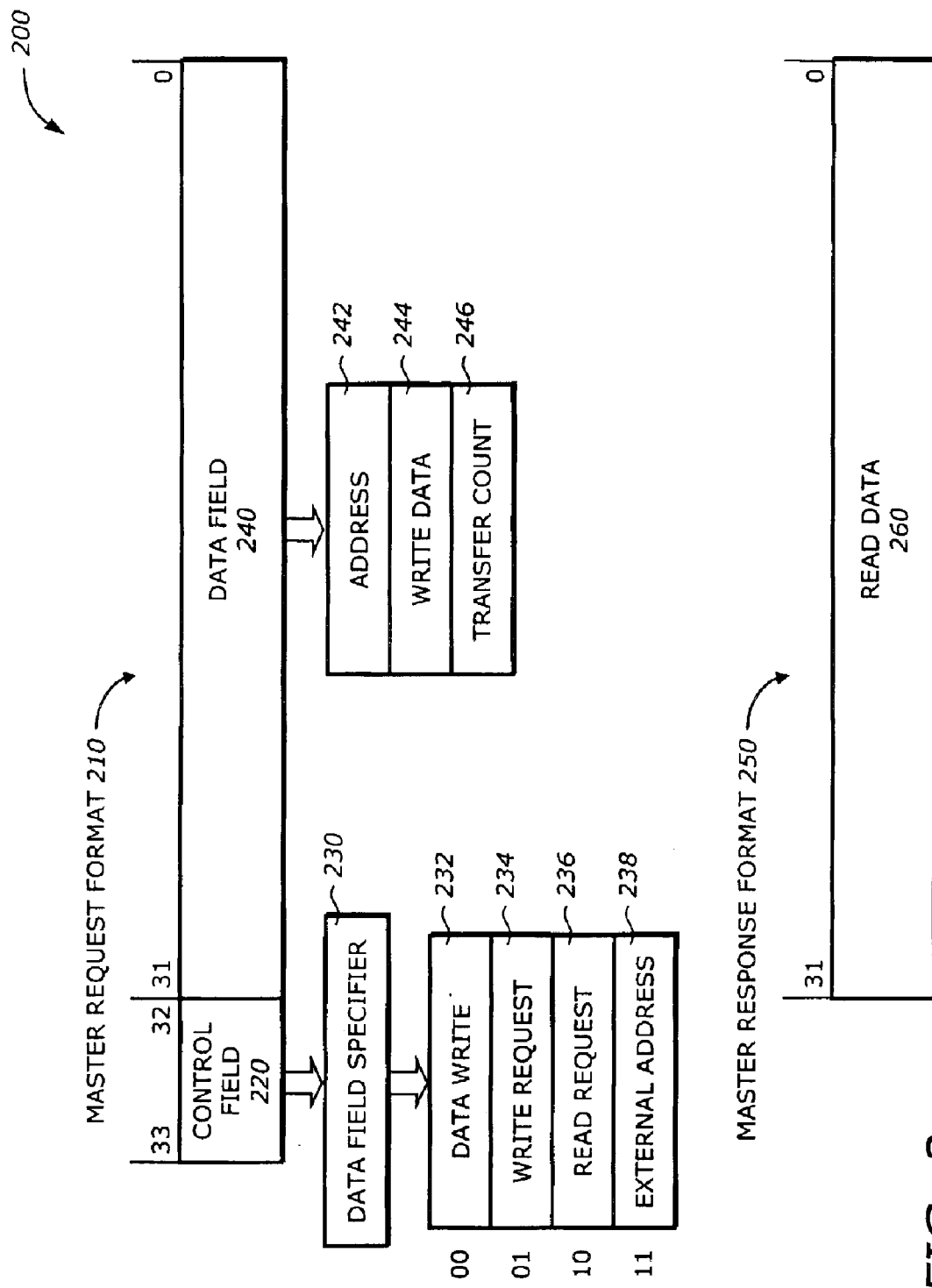
FIG. 2 is a diagram illustrating a master format according to one embodiment of the invention.

FIG. 2 is a diagram illustrating a master format 200 according to one embodiment of the invention. The master format 200 is used for information written to the MREQ storage element 150 and the MRSP storage element 160. The master format 200 includes a MREQ format 210 and a MRSP format 250.

The MREQ format 210 is used by the internal processor 110 when writing to the MREQ storage element 150 shown in FIG. 1. The MREQ format 210 includes a control field 220 and a data field 240. The MREQ information is pushed onto the MREQ storage element 150 by the internal processor 110 and popped out by the external processor 120.

The control field 220 contains control information to be interpreted or decoded by the MREQ decoder 155 (FIG. 1). The control field 220 in essence indicates how the information in the data field 240 is to be used. The control field 220 contains a data field specifier 230. Other information may also be included. The data field specifier 230 specifies one of a data write 232, a write request 234, a read request 236 and an external address 238. Since there are four specifiers, the data field specifier 230 may be encoded using two bits. As an example, the data field specifier 230 may be encoded as 00, 01, 10, and 11 for the data write 232, the write request 234, the read request 236 and the external address 238. As is known by one skilled in the art, any other encodings may be used.

The data field 240 contains one of an address 242, a write data 244, and a transfer count 246 according to the control field 220. The address 242 corresponds to the external address 238. The write data 244 corresponds to the data write 232. The transfer count 246 corresponds to one of the write request 234 and the read request 236. The data field 240 has a field width compatible with the size of the data. In one embodiment, the data field 240 occupies bits 0 through bits 31 for a 32-bit field width, and the control field 220 occupies bits 32 and 33. The MREQ storage element 150 (FIG. 1) therefore has a data width of 34 bits. When the control field 220 contains the data write 232, the data field 240 contains the write data 244. When the control field 220 contains the write request 234 or the read request 236, the data field 240 contains the transfer count 246. The transfer count 246 indicates the number of transfers or words to be transferred by the internal processor 110. When the internal processor 110 is a DMA engine, this transfer count is the DMA count. When the control field 220 contains the external address 238, the data field 240 contains the address 242.

The MRSP format 250 is used by the MRSP storage element 160. The MRSP format 250 contains a read data field 260 which simply is the data to be read by the internal processor 110. The read data is pushed by the external processor 120 and popped by the internal processor 110.

Figure 3:
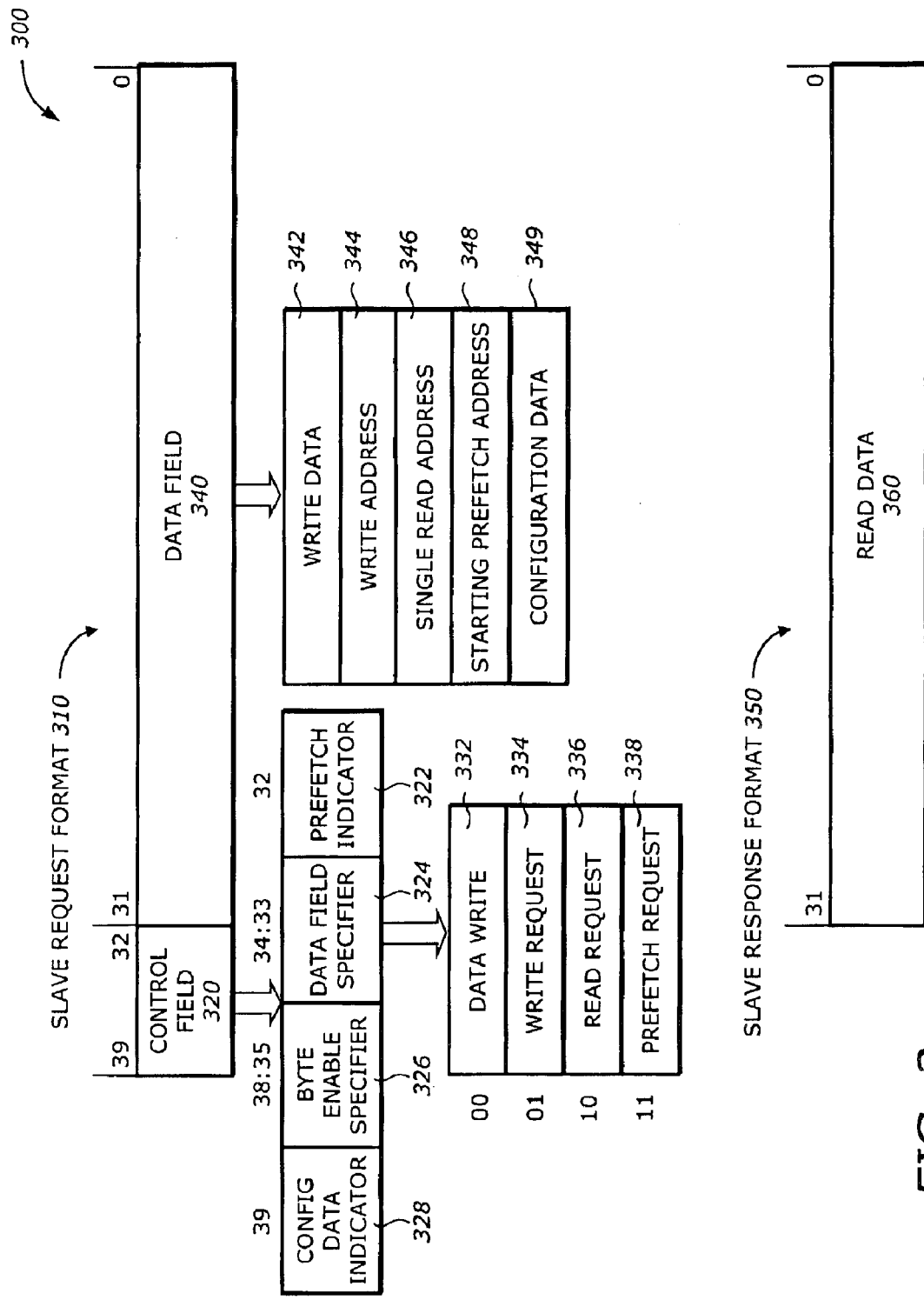
FIG. 3 is a diagram illustrating a slave format shown according to one embodiment of the invention.

FIG. 3 is a diagram illustrating a slave format 300 shown according to one embodiment of the invention. The slave format 300 is used for information written to the MREQ 150. The slave format 300 includes a SREQ format 310 and a SRSP format 350.

The SREQ format 310 is used by the external processor 120 when writing to the SREQ storage element 170 shown in FIG. 1. The SREQ format 310 includes a control field 320 and a data field 340. The SREQ information is pushed onto the SREQ storage element 170 by the external processor 120 and popped out by the internal processor 110.

The control field 320 contains control information to be interpreted or decoded by the SREQ decoder 175 (FIG. 1). The control field 320 in essence indicates how the information in the data field 340 is to be used and provides other control information. The control field 320 contains prefetch indicator 322, a data field specifier 324, a byte enable specifier 326, and a configuration data indicator 328. Other information may also be included. The prefetch indicator 322 indicates if the end of a prefetch request has been reached. The prefetch request 338 is a request for prefetched data by the external processor 120. Prefetching allows the external processor 120 to be a fast slave because several memory locations are fetched ahead of time and buffered in the SRSP storage element 180. If the prefetch indicator 322 is asserted (e.g., set to logical 1), the external processor 120 is requesting a prefetch. Otherwise, if the prefetch indicator is negated (e.g., reset to logical 0), the external processor 120 is requesting a single read of a single word. The data field specifier 324 specifies one of a data write 332, a write request 334, a read request 336 and a prefetch request 338. Since there are four specifiers, the data field specifier 230 may be encoded using two bits. As an example, the data field specifier 332 may be encoded as 00, 01, 10, and 11 for the data write 332, the write request 334, the read request 336 and the prefetch address 338. As is known by one skilled in the art, any other encodings may be used. The byte enable specifier 326 specifies the byte(s) that is (are) enabled for the write data. Typically the byte enable specifier 326 is passed straight through without going through the SREQ decoder 175 to the internal processor 110. The configuration data indicator 328 indicates if the data field 340 contains the configuration data to be used by the internal processor 110. If it is asserted, then the data field 340 contains the configuration data. Otherwise, it indicates a normal data request. The field width of the control field 320 is sufficient to accommodate the desired size. In one embodiment, the prefetch indicator 322 is one-bit occupying bit 32, the data field specifier 324 is two-bit occupying bits 33:34, the byte enable specifier 326 is four-bit occupying bits 35:38, and the configuration data indicator 328 is one-bit occupying bit 39. The total control field width is 8-bit.

The data field 340 contains one of a write data 342, a write address 344, a single read address 346, a starting prefetch address 348, and a configuration data 349 according to the control field 320. The write data 342 corresponds to the data write 332. The write address 344 corresponds to the write request 334. The single read address 346 corresponds to the read request 336. The starting prefetch address 348 corresponds to the prefetch request 338, and the configuration data 349 corresponds to the configuration data indicator 328. When the data field specifier 324 contains the data write 332, the data field 340 contains the write data 342. When the data field specifier 324 contains the write request 334, the data field 340 contains the write address 344. When the data field specifier 324 contains the read request 336 and the prefetch indicator 322 is negated, the data field 340 contains the single read address 346. When the data field specifier 324 contains the prefetch request 338 and the prefetch indicator 322 is asserted, the data field 340 contains the starting prefetch address 348. When the configuration data specifier 328 is asserted, the data field 340 contains the configuration data 349. In the prefetch mode, when the external processor 120 wants to stop the prefetching, it generates an end-of-transaction (EOT) command. This can be performed by negating the prefetch indicator 322.

The SRSP format 350 is used by the SRSP storage element 180. The SRSP format 350 contains a read data field 360 which is the data to be read by the external processor 120. The read data is pushed by the internal processor 110 onto the SRSP storage element 180 and popped by the external processor 120. Note that if the storage elements 150, 160, 170, and 180 are implemented by FIFO's, a push operation implies that a check for full state has been performed. If the FIFO is full, the operation may be suspended until the FIFO becomes non-full. Similarly, a pop operation implies that a check for an empty state has been performed. If the FIFO is empty, the pop operation may be suspended until the FIFO becomes empty.

Figure 4:
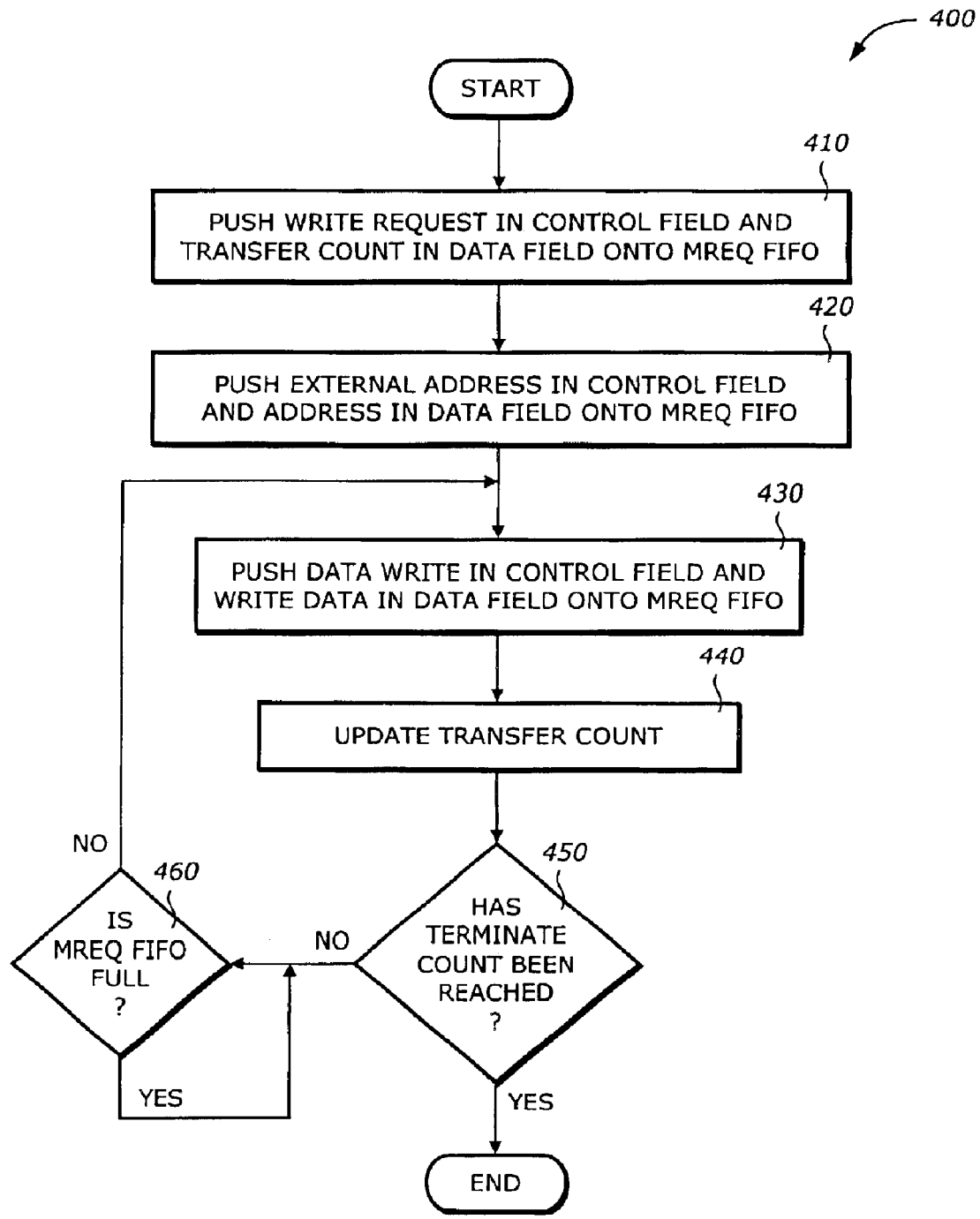
FIG. 4 is a flowchart illustrating a process to perform a master write transaction according to one embodiment of the invention.

FIG. 4 is a flowchart illustrating a process 400 to perform a master write transaction according to one embodiment of the invention.

Upon START, the process 400 pushes the write request in the control field and the transfer count in the data field onto the MREQ storage element 150 (Block 410). Then, the process 400 pushes the external address in the control field and the address in the data field onto the MREQ storage element 150 (Block 420). Next, the process 400 pushes the data write in the control field and the write data in the data field onto the MREQ storage element 150 (Block 430). Then, the process 400 updates the transfer count (Block 440). Typically, this involves decrementing a counter in the internal processor 110.

Next, the process 400 determines if the terminate count has been reached (Block 450). Typically, this is done by checking if the counter has reached zero. A DMA engine usually generates a flag indicating the transfer counter has reached zero. If the terminate count has not been reached, the process 400 determines if the MREQ storage element 150 is full (Block 460). If it is full indicating that the external processor 120 has not read the information in the MREQ storage element 150, the process 400 returns back to Block 460 waiting for the external processor 120. Otherwise, it goes back to Block 430 to continue the data write transaction. If the terminate count has been reached, the process 400 is terminated.

Figure 5:
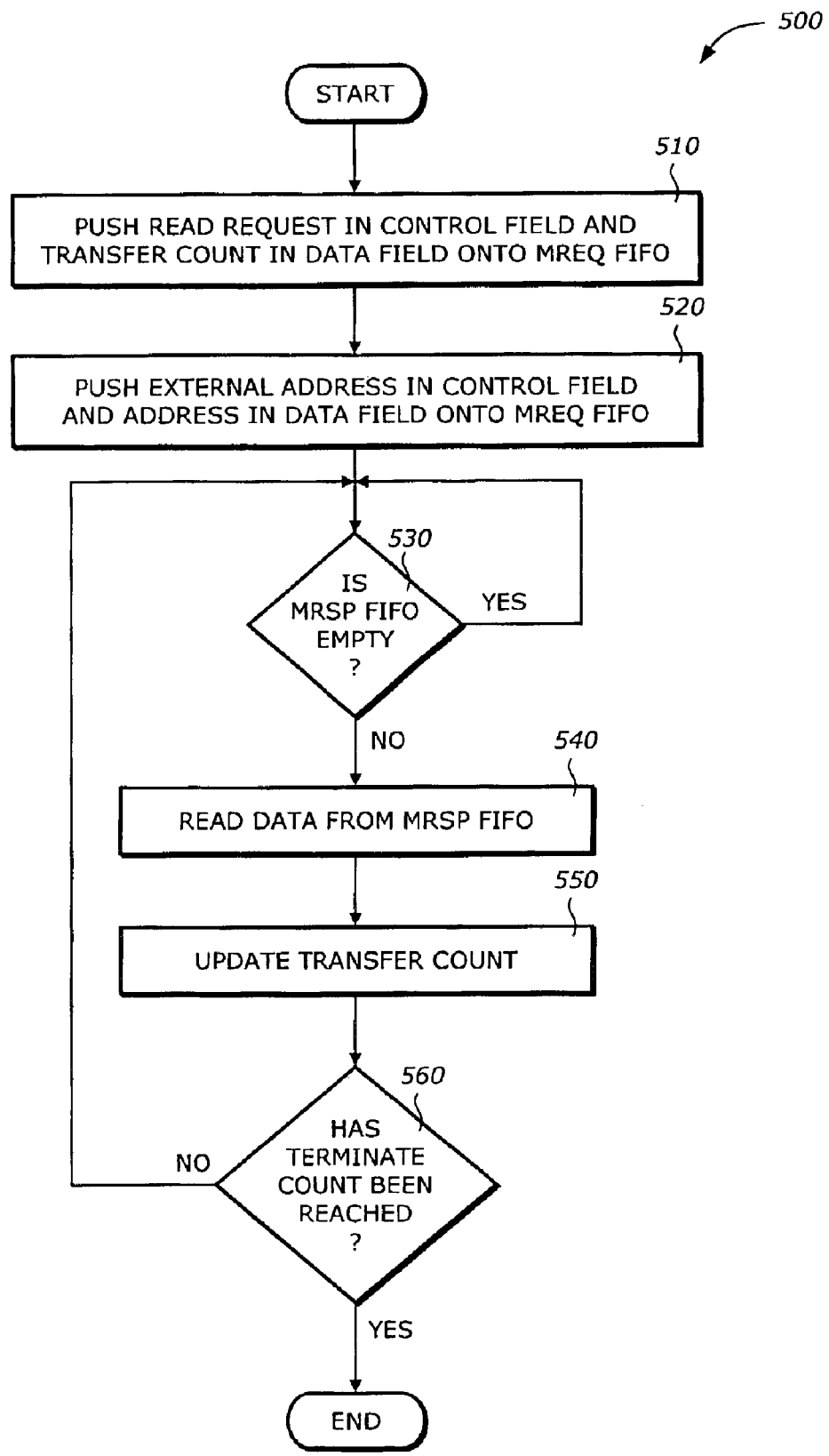
FIG. 5 is a flowchart illustrating a process to perform a master read transaction according to one embodiment of the invention.

FIG. 5 is a flowchart illustrating a process 500 to perform a master read transaction according to one embodiment of the invention.

Upon START, the process 500 pushes the read request in the control field and the transfer count in the data field onto the MREQ storage element 150 (Block 510). Next, the process 500 pushes the external address in the control field and the address in the data field onto the MREQ storage element 150 (Block 520). Then, the process 500 determines if the MRSP storage element is empty (Block 530). If it is empty, indicating that the external processor 120 has not written data, the process 500 returns back to Block 530 waiting for the external processor 120 to respond. Otherwise, the process 500 reads the data from the MRSP storage element 160 (Block 540).

Next, the process 500 updates the transfer count in the counter (Block 550). Typically the transfer count is kept tracked of by the internal processor. Then, the process 500 determines if the terminate count has been reached (Block 560). If not, the process 500 returns back to Block 530 to continue reading data from the MRSP storage element 160. Otherwise, the process 500 is terminated.

Figure 6:
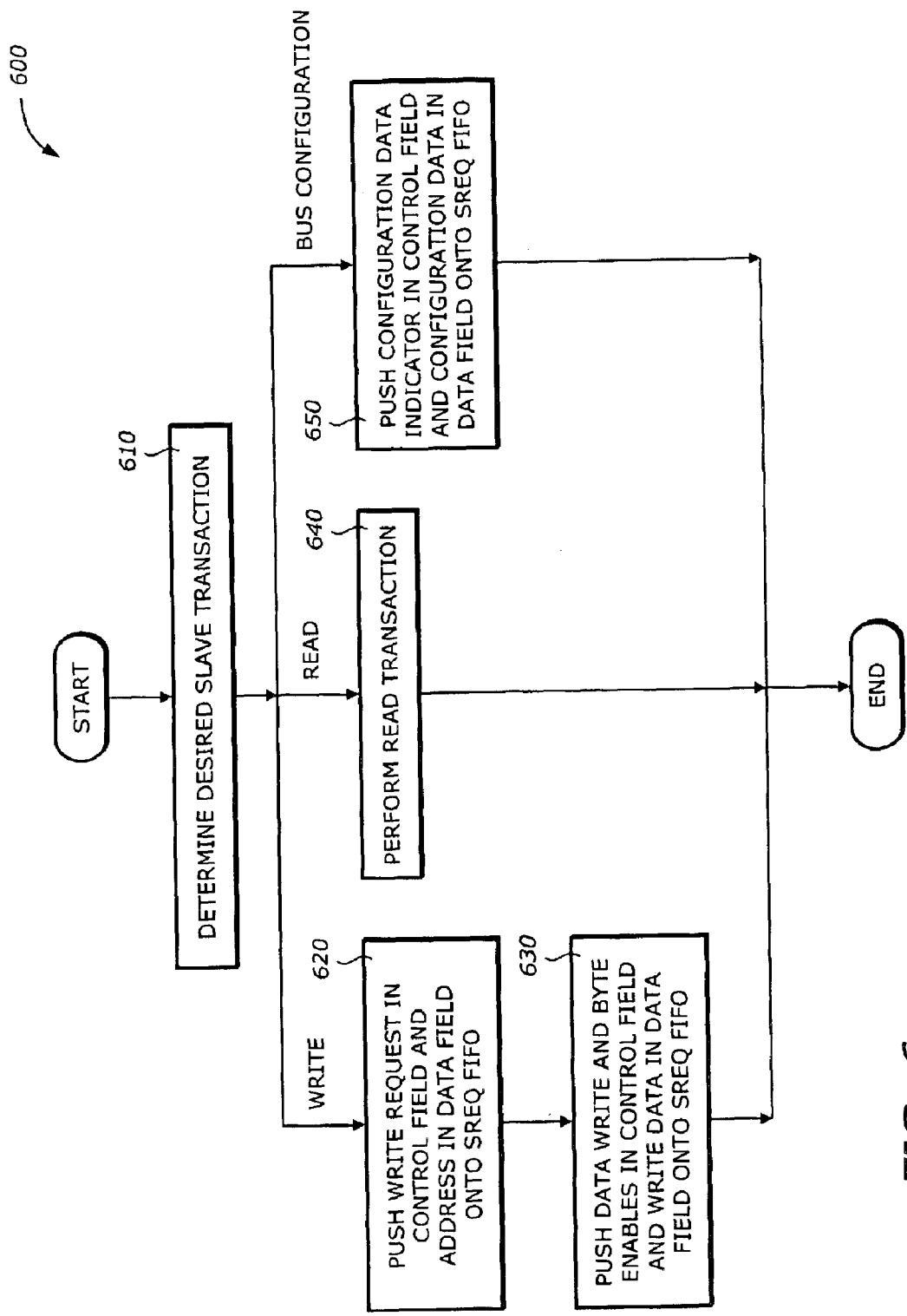
FIG. 6 is a flowchart illustrating a process to perform slave transactions according to one embodiment of the invention.

FIG. 6 is a flowchart illustrating a process 600 to perform slave transactions according to one embodiment of the invention.

Upon START, the process 600 determine the desired slave transaction (Block 610). If a slave write transaction is desired, the process 600 pushes the write request in the control field and the address in the data field onto the SREQ storage element 170 (Block 620). Then, the process 600 pushes the data write and the byte enables in the control field and the write data in the data field onto the SREQ storage element 170 (Block 630) and is then terminated. If a slave read transaction is desired, the process 600 performs the read transaction (Block 640) and is then terminated. The details of the read transaction are described in FIG. 7. If a bus configuration transaction is desired, the process 600 pushes the configuration data indicator in the control field and the configuration data in the data field onto the SREQ storage element 170 and is then terminated (Block 650).

Figure 7:
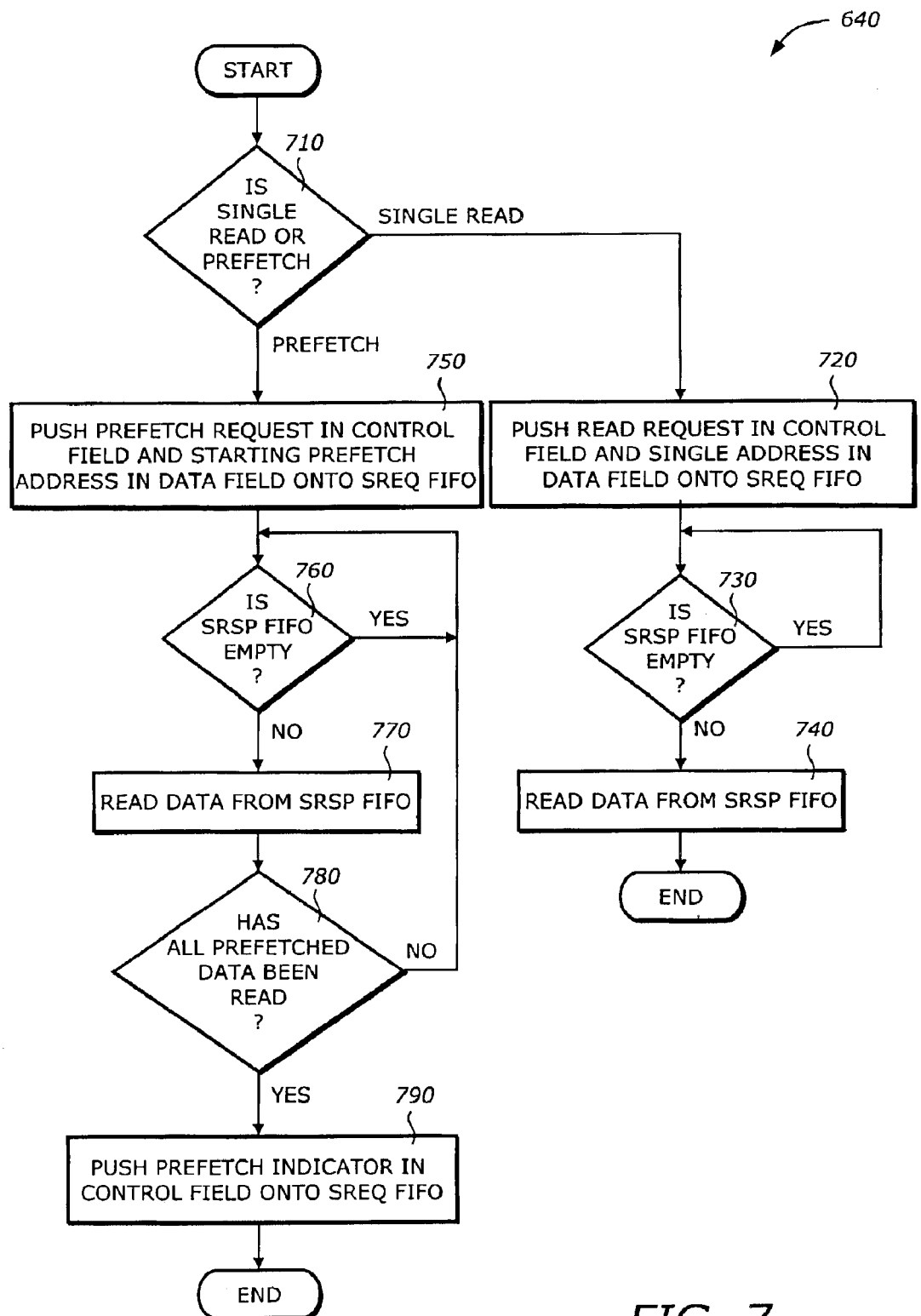
FIG. 7 is a flowchart illustrating a process to perform a slave read transaction according to one embodiment of the invention.

FIG. 7 is a flowchart illustrating the process 640 to perform the slave read transaction according to one embodiment of the invention.

Upon START, the process 640 determines if a single read or a prefetch is desired (Block 710). If a single read is desired, the process 640 pushes the read request in the control field and the single address in the data field onto the SREQ storage element 170 (Block 720). Then, the process 640 determines if the SRSP storage element 180 is empty (Block 730). If it is, indicating that the internal processor 110 has not responded, the process 640 returns back to Block 730 waiting for the internal processor 110. Otherwise, the process 640 reads data from the SRSP storage element 180 (Block 740) and is then terminated.

If a prefetch is desired, the process 640 pushes the prefetch request in the control field and the starting prefetch address in the data field onto the SREQ storage element 170 (Block 750). Then, the process 640 determines if the SRSP storage element 180 is empty (Block 760). If it is, indicating that the internal processor 110 has not responded, the process 640 returns back to Block 730 waiting for the internal processor 110. Otherwise, the process 640 reads data from the SRSP storage element 180 (Block 770). Next, the process 640 determines if all the prefetched data have been read (Block 780). If not, the process 640 returns back to Block 760 to read the next prefetched data. Otherwise, the process 640 pushes the prefetch indicator in the control field onto the SREQ storage element 170 to notify an end of transaction to the internal processor 110 (Block 790) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a first storage element to store request information transmitted from a first processor operating at a first frequency, the request information being organized according to a request format;
    a second storage element to store response information transmitted by a second processor in response to the request information, the second processor operating at a second frequency different than the first frequency, the response information being organized according to a response format; and
    an access pointer to point to one of the first and second storage elements, the access pointer being accessible by the first and second processors.

2. The apparatus of claim 1 wherein the request format includes a data field and a control field.

3. The apparatus of claim 2 wherein the control field contains at least one of a data field specifier, the data field specifier specifying at least one of a data write, a write request, a read request, and an external address.

4. The apparatus of claim 3 wherein the data field contains at least one of one of address, write data, and transfer count according to the control field, the address corresponding to the external address, the write data corresponding to the data write, the transfer count corresponding to one of the write request and the read request.

5. The apparatus of claim 2 wherein the control field contains at least one of a prefetch indicator, a data field specifier, a byte enable specifier, and a configuration data indicator, the data field specifier specifying at least one of a data write, a write request, a read request, and a prefetch request.

6. The apparatus of claim 5 wherein the data field contains at least one of write data, write address, single read address, and starting prefetch address corresponding to the data write, the write request, the read request, and the prefetch request, respectively.

7. The apparatus of claim 1 wherein one of the first and second processors is one of a direct memory access (DMA) engine and an external bus master.

8. The apparatus of claim 1 wherein the response format includes a read data field.

9. A method comprising:
    storing request information in a first storage element, the request information being transmitted from a first processor operating at a first frequency and organized according to a request format;
    storing response information in a second storage element in response to the request information, the response information being transmitted by a second processor operating at a second frequency different than the first frequency and organized according to a response format; and
    pointing to one of the first and second storage elements by an access pointer, the access pointer being accessible by the first and second processors.

10. The method of claim 9 wherein one of the first and second storage elements is an asynchronous first-in-first-out memory.

11. The method of claim 9 wherein the request format includes a data field and a control field.

12. The method of claim 11 wherein the control field contains at least one of a data field specifier, the data field specifier specifying at least one of a data write, a write request, a read request, and an external address.

13. The method of claim 12 wherein the data field contains at least one of address, write data, and transfer count according to the control field, the address corresponding to the external address, the write data corresponding to the data write, the transfer count corresponding to one of the write request and the read request.

14. The method of claim 11 wherein the control field contains at least one of a prefetch indicator, a data field specifier, a byte enable specifier, and a configuration data indicator, the data field specifier specifying one of a data write, a write request, a read request, and a prefetch request.

15. The method of claim 14 wherein the data field contains at least one of write data, write address, single read address, and starting prefetch address corresponding to the data write, the write request, the read request, and the prefetch request, respectively.

16. The method of claim 9 wherein one of the first and second processors is one of a direct memory access (DMA) engine and an external bus master.

17. The method of claim 9 wherein the response format includes a read data field.

18. A system comprising:
    first and second processors operating at different frequencies;
    a bus; and
    a buffer subsystem coupled to the first and second processors via the bus, the buffer subsystem comprising:
        a first storage element to store request information transmitted from the first processor, the request information being organized according to a request format, and
        a second storage element to store response information transmitted by the second processor in response to the request information, the response information being organized according to a response format;
    wherein the request format includes a data field and a control field and the control field contains at least one of a data field specifier, the data field specifier specifying at least one of a data write, a write request, a read request, and an external address.

19. The system of claim 18 wherein one of the first and second processors is a network processor interfacing to a Voice Over Packet (VOP) gateway.

20. The system of claim 18 wherein one of the first and second processors is a network processor interfacing to a Public Switched Telephone Network (PSTN).

21. The system of claim 18 wherein the data field contains at least one of address, write data, and transfer count according to the control field, the address corresponding to the external address, the write data corresponding to the data write, the transfer count corresponding to one of the write request and the read request.

22. The system of claim 18 wherein the control field contains at least one of a prefetch indicator, a data field specifier, a byte enable specifier, and a configuration data indicator, the data field specifier specifying at least one of a data write, a write request, a read request, and a prefetch request.

23. The system of claim 22 wherein the data field contains at least one of write data, write address, single read address, and starting prefetch address corresponding to the data write, the write request, the read request, and the prefetch request, respectively.

24. The system of claim 18 wherein one of the first and second processors is one of a direct memory access (DMA) engine and an external bus master.

25. The system of claim 18 wherein the response format includes a read data field.

26. An article of manufacture comprising:
a machine-accessible medium including data that, when accessed by a machine, causes the machine to perform operations comprising:
storing request information in a first storage element, the request information being transmitted from a first processor operating at a first frequency and organized according to a request format;
storing response information in a second storage element in response to the request information, the response information being transmitted by a second processor operating at a second frequency different from the first frequency and organized according to a response format; and
pointing to one of the first and second storage elements by an access pointer, the access pointer being accessible by the first and second processors.

27. The article of manufacture of claim 26 wherein one of the first and second storage elements is an asynchronous first-in-first-out memory.

28. The article of manufacture of claim 26 wherein the request format includes a data field and a control field.

29. The article of manufacture of claim 28 wherein the control field contains at least one of a data field specifier, the data field specifier specifying at least one of a data write, a write request, a read request, and an external address.

30. The article of manufacture of claim 29 wherein the data field contains at least one of address, write data, and transfer count according to the control field, the address corresponding to the external address, the write data corresponding to the data write, the transfer count corresponding to one of the write request and the read request.

31. The article of manufacture of claim 28 wherein the control field contains at least one of a prefetch indicator, a data field specifier, a byte enable specifier, and a configuration data indicator, the data field specifier specifying at least one of a data write, a write request, a read request, and a prefetch request.

32. The article of manufacture of claim 31 wherein the data field contains at least one of write data, write address, single read address, and starting prefetch address corresponding to the data write, the write request, the read request, and the prefetch request, respectively.

33. The article of manufacture of claim 26 wherein one of the first and second processors is one of a direct memory access (DMA) engine and an external bus master.

34. The article of manufacture of claim 26 wherein the response format includes a read data field.

* * * * *